United States Patent [19]

Brown et al.

[11] Patent Number: 5,130,419

[45] Date of Patent: Jul. 14, 1992

[54] PROCESS FOR PREPARING LIGNOCELLULOSIC BODIES

[75] Inventors: James P. Brown, Evercreech, England; Martin C. Barker, Bertem; Viviane G. J. Neyens, Heverlee, both of Belgium

[73] Assignee: Imperial Chemical Industrial PLC, London, England

[21] Appl. No.: 659,585

[22] Filed: Feb. 21, 1991

[30] Foreign Application Priority Data

Sep. 3, 1990 [GB] United Kingdom ................ 9005281

[51] Int. Cl.$^5$ .......................... C07G 1/00; C08L 97/02
[52] U.S. Cl. .................................. 530/506; 530/200; 530/500; 264/126
[58] Field of Search ....................... 524/107, 198, 199; 528/51, 72, 75; 521/54, 159, 176; 530/200, 500, 586; 264/126

[56] References Cited

U.S. PATENT DOCUMENTS

| | | | |
|---|---|---|---|
| 4,329,437 | 5/1982 | Blount | 530/506 |
| 4,472,550 | 9/1984 | Reiff et al. | 524/589 |
| 4,692,292 | 9/1987 | Kollmeier et al. | 264/126 |

*Primary Examiner*—John Kight, III
*Assistant Examiner*—Duc Truong

[57] ABSTRACT

Process for preparing lignocellulosic bodies by bringing lignocellulosic parts into contact with a composition comprising a polyisocyanate, fumed silica and a non-ionic liquid gellant and by pressing this combinations of parts and composition.

The adhesion of the parts is excellent and the binder composition can be easily sprayed.

10 Claims, No Drawings

PROCESS FOR PREPARING LIGNOCELLULOSIC BODIES

The present invention is concerned with a process for the preparation of lignocellulosic bodies from lignocellulosic parts and a polyisocyanate binder composition.

It is known to prepare lignocellulosic bodies from lignocellulosic parts by bringing such parts into contact with a binder and by pressing the combination. As binders—inter alia—polyisocyanates may be used. Although such polyisocyanates have been used as binders successfully in the past, there remained room for improvement. The polyisocyanates, once brought into contact with the lignocellulosic parts, are partly absorbed by those parts.

Surprisingly, it has been found that the absorption of polyisocyanates into the lignocellulosic parts can be greatly reduced if a binder composition is applied which comprises a polyisocyanate, fumed silica and a non-ionic liquid gellant. The adhesion of the parts which have been bound by means of such a binder composition is excellent and the binder composition can be easily sprayed.

Consequently, the present invention is concerned with a process for preparing lignocellulosic bodies b bringing lignocellulosic parts into contact with a composition comprising a polyisocyanate, fumed silica and a non-ionic liquid gellant and by pressing this combination of parts and composition.

The polyisocyanates may be any organic polyisocyanate compound or mixture of organic polyisocyanate compounds, provided said compounds have at least 2 isocyanate groups. Organic polyisocyanates include di-isocyanates, particularly aromatic di-isocyanates, and isocyanates of higher functionality.

Examples of organic polyisocyanates which may be used in the process of the invention include aliphatic isocyanates such as hexamethylene diisocyanate; and aromatic isocyanates such as meta- and para-phenylene diisocyanate, tolylene-2,4- and 2,6-diisocyanates, diphenylmethane-4,4'-diisocyanate, chlorophenylene-2,4-diisocyanate, naphtylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane -2,4-and 2,3-diisocyanates, 1-methylcyclohexyl-2,4- and 2,6-diisocyanates and mixtures thereof and bis-(isocyanatocyclohexyl-)methane and tri- isocyanates such as 2,4,6-triisocyanatotoluene and 2,4,4-triisocyanatodiphenylether.

Modified polyisocyanates containing isocyanurate-, carbodiimide- or uretonimine groups may be employed as well. Further blocked polyisocyanates, like the reaction product of a phenol or an oxime and a polyisocyanate, may be used, having a deblocking temperature below the temperature applied when using the polyisocyanate composition.

Mixtures of isocyanates may be used, for example a mixture of tolylene diisocyanate isomers such as the commercially available mixtures of 2,4- and 2,6-isomers and also the mixture of di- and higher polyisocyanates produced by phosgenation of aniline/formaldehyde condensates.

Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred isocyanates to be used in the present invention are those wherein the isocyanate is an aromatic diisocyanate or polyisocyanate of higher functionality such as a pure diphenylmethane diisocyanate or mixtures of methylene bridged polyphenyl polyisocyanates containing diisocyanates, triisocyanates and higher functionality polyisocyanates.

Methylene bridged polyphenyl polyisocyanates are well known in the art and have the generic formula:

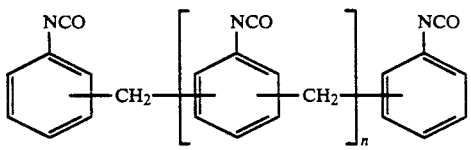

where n is 0 or more. They are prepared by phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as MDI.

Preferably, the polyisocyanate is liquid at room temperature.

The lignocellulosic parts used may be wood chips, wood fibres, shavings, veneers, cork, bark, sawdust and like waste products of the woodworking industry as well as other material having a lignocellulosic basis such as bagasse, straw, flax, sisal, hemp, rushes, reeds, husks and grasses. Additionally there may be mixed with the lignocellulosic parts, other particulates of fibrous materials such as glass fibre, mica, rubber and plastics.

The lignocellulosic bodies according to the present invention may be strawboard, chipboard, plywood, fibreboard and other bodies made from the aforementioned lignocellulosic parts.

As the fumed silica, use can be made of any type, like e.g. the commercially available Aerosil A 380, A 200V, R 974, R 812 and R 05 (all from Degussa). The fumed silica preferably has a surface area of at least 100 m$^2$/g. Suitable non-ionic liquid gellants are Siloxanes having oxyethylene groups in the polyoxyalkylene chain(s). They have a molecular weight of 500 to 30.000 The amount of oxyethylene groups in the siloxane may range from 30–95 % w. The average degree of polymerization for one polyoxyalkylene chain may range from 2–150, preferably from 3–60. Although the polyoxyalkylene chains may comprise other groups than oxyethylene groups, like e.g. oxypropylene groups, preferably the polyoxyalkylene chains are polyoxyethylene chaines. Suitable, commercially available siloxanes are Tegostab B 8407 from Goldschmidt and DABCO DC 193 from Air Products.

Oxyalkylated polyamines, like oxyalkylated ethylene diamine. Such surfactants are obtainable under the tradename Synperonic from Imperial Chemical Industries.

Oxyalkylated hydrocarbyls, like oxyalkylated saturated or unsaturated 3–30 carbon atoms comprising aliphatic hydrocarbons (e.g. "Brij", "Renex"720, Arlamol E and ethoxylated 3-hydroxy-propylene having 4-20 oxyethylene groups) and like oxyalkylated alkylphenol (e.g. Renex 678 and 750 and Triton X-100).

Preferably, the non-ionic liquid gellant is blocked, which means that the reactive hydroxy end groups in the gellant have been made inactive like by esterification with a lower organic acid, e.g. acetic acid.

The compositions further may comprise conventional additives like an inert diluent and/or solvent, lignocellulosic preserving agents, fire retardants, sizing agents, mould release agents, wax polishes, silicones, polytetrafluoroethylene, water in case an emulsifiable polyisocyanate is used, wax release agents like those described in U.S. Pat. Nos. 4,388,138 and 4,431,455 and other binders like formaldehyde condensate adhesive resin.

The composition is made by combining and mixing the polyisocyanate and the gellant followed by adding and mixing under high shear conditions the silica, all at a temperature of 10–80° C., preferably at ambient temperature and at ambient pressure. Preferably the polyisocyanate and the silica are first combined and mixed under high shear conditions and then the gellant is added and mixed.

The lignocellulosic bodies are prepared by bringing the lignocellulosic parts into contact with the composition comprising a polyisocyanate, fumed silica and a non-ionic liquid gellant like by means of mixing, spraying and/or spreading the composition with/onto the parts and by pressing the combination of the composition and the parts, preferably by hot-pressing, normally at 150–220° C. and 20–70 kg/cm³.

A particularly preferred method for preparing the lignocellulosic bodies is by using the polyisocyanate composition immediately or almost immediately after it has been made. In order to attain this a conventional apparatus for making lignocellulosic bodies is extended with a container for the gellant, with a feed originating from this container and ending in the feed from the polyisocyanate container to the zone, where the polyisocyanate composition and the lignocellulosic parts are brought into contact, and with a mixer placed at the point where the gellant feed enters the polyisocyanate feed or shortly down-stream; the polyisocyanate container would contain the polyisocyanate/silica dispersion; the place where the gellant feed enters the polyisocyanate feed is located close to the entry of the polyisocyanate feed into the zone where the polyisocyanate composition and the lignocellulosic parts are brought into contact.

The amount of silica in the composition may range from 1–5% w, while the amount of gellant may range from 0.1–4% w.

The present invention is illustrated with the following examples:

EXAMPLE 1

The following polyisocyanate compositions have been used:

| Composition | Polyisocyanate (pbw) | Silica (pbw) | Gellant (pbw) |
|---|---|---|---|
| 1 | 97 | 3 | 0 |
| 2 | 97 | 3 | 0.35 |
| 3 | 97 | 3 | 0.82 |
| 4 | 97 | 3 | 1.00 |
| 5 | 98 | 2 | 0.96 |
| Reference | 100 | 0 | 0 |

The polyisocyanate used with Suprasec DNR from Imperial Chemical Industries PLC (Suprasec is a trademark).

The silica used with Aerosil A 380 from Degussa (Aeorsil is a trademark).

The gellant used with Tegostab B8407 from Goldschmidt for compositions 2 and 3 and Dabco DC 193 from Air Products for compositions 4 and 5 (Tegostab and Dabco are trademarks). The compositions were made by diluting a 6% w silica dispersion in polyisocyanate, prepared by mixing the silica and the polyisocyanate under high-sheer conditions for 15 minutes, with polyisocyanate so as to obtain the required silica concentration and by adding subsequently the required amount of gellant dropwise under normal mixing.

EXAMPLE 2

The compositions made in Example 1 were used to make waferboard at conditions typical of commercial manufacture:

| BOARD PROCESSING CONDITION | |
|---|---|
| resin % | 2.0 and 3.5 |
| MC % Flake (OD) | 7.0 and 10.0 |
| Board Replicates | 3 |
| Furnish Type | Aspen |
| Wax Type | Esso 778 |
| Wax Dose, % | 1.0 |
| Board Thickness, In. | 7/16" |
| Board Size | 2' × 4' |
| Board Density, pcf | 40 |
| Close Time, sec. | 30 |
| Cook, sec./ 1/16 | 25 |
| Decompression, sec. | 30 |
| Press temperature, °F. | 400 |
| Press cycle | Press to stops using position control |

The polyisocyanate compositions were delivered to the waferboard blender by a peristaltic pump over a period of 5–10 minutes, a spinning disc applicator rotating at 5000 rpm being employed for polyisocyanate atomisation onto the aspen wafers. The finished board was tested for internal bond strength both in a dry state and after having been immersed in boiling water for 2 hours.

The results are given in the following table.

| Polyisocyanate composition | Amount of polyisocyanate % w | Moisture content in wafers, % w | Internal bond strength | |
|---|---|---|---|---|
| | | | dry | 2 hours boiling |
| Reference | 2.0 | 7.0 | 52 | 10 |
| 1 | 2.0 | 7.0 | 76 | 18 |
| 2 | 2.0 | 7.0 | 74 | 24 |
| 3 | 2.0 | 7.0 | 96 | 33 |
| 4 | 2.0 | 7.0 | 90 | 40 |
| 5 | 2.0 | 7.0 | 88 | 24 |
| Reference | 2.0 | 10.0 | 70 | 12 |
| 1 | 2.0 | 10.0 | 84 | 21 |
| 2 | 2.0 | 10.0 | 71 | 20 |
| 3 | 2.0 | 10.0 | 85 | 39 |
| 5 | 2.0 | 10.0 | 73 | 17 |
| Reference | 3.5 | 7.0 | 90 | 42 |
| 1 | 3.5 | 7.0 | 88 | 52 |
| 2 | 3.5 | 7.0 | 73 | 52 |
| 3 | 3.5 | 7.0 | 114 | 60 |
| 5 | 3.5 | 7.0 | 120 | 74 |
| Reference | 3.5 | 10.0 | 85 | 35 |
| 1 | 3.5 | 10.0 | 116 | 62 |
| 2 | 3.5 | 10.0 | 97 | 55 |
| 3 | 3.5 | 10.0 | 109 | 54 |

-continued

| Polyisocyanate composition | Amount of polyisocyanate % w | Moisture content in wafers, % w | Internal bond strength | |
|---|---|---|---|---|
| | | | dry | 2 hours boiling |
| 5 | 3.5 | 10.0 | 97 | 64 |

The internal bond strength is expressed in pounds/feet$^2$.

We claim:

1. Process for preparing lignocellulosic bodies by bringing lignocellulosic parts into contact with a composition comprising a polyisocyanate, fumed silica and a non-ionic liquid gellant and by pressing this combination of parts and composition.

2. Process according to claim 1 characterised in that the composition is made by combining the polyisocyanate and the silica, mixing under high shear conditions said polyisocyanate and silica, adding the gellant to the dispersion obtained and mixing the dispersion and the surfactant.

3. Process according to claim 1, characterised in that the composition is made by combining and mixing a polyisocyanate/silica dispersion and the gellant.

4. Process according to claim 1 characterised in that the amount of silica is 1-5% w calculated on the polyisocyanate composition.

5. Process according to claim characterised in that the amount of gellant is 0.1-4% w calculated on the polyisocyanate composition.

6. Process according to claim 1 characterised in that the amount of silica is 1-5% w and the amount of gellant is 0.1-4% w, both calculated on the polyisocyanate composition.

7. Polyisocyanate composition comprising fumed silica and a non-ionic liquid gellant.

8. Polyisocyanate composition comprising 1-5% w of fumed silica and 0.1-4% w of a non-ionic liquid gellant, both calculated on the polyisocyanate composition.

9. The use of a polyisocyanate composition comprising fumed silica and a non-ionic liquid gellant for preparing lignocellulosic bodies from lignocellulosic parts.

10. The use of a polyisocyanate composition comprising 1-5% w of fumed silica and 0.1-4% w of a non-ionic liquid gellant, both calculated on the polyisocyanate composition, for preparing lignocellulosic bodies from lignocellulosic parts.

* * * * *

UNITED STATES PATENT AND TRADEMARK OFFICE
CERTIFICATE OF CORRECTION

PATENT NO. : 5,130,419
DATED : JULY 14, 1992
INVENTOR(S) : BROWN, BARKER AND NEYENS

It is certified that error appears in the above-identified patent and that said Letters Patent is hereby corrected as shown below:

In the Foreign Application Priority Data, on the cover page of the patent, "September 3, 1990" should read --March 9, 1990--.

Signed and Sealed this

Thirty-first Day of August, 1993

Attest:

BRUCE LEHMAN

*Attesting Officer*  *Commissioner of Patents and Trademarks*